United States Patent
Grandhi

(10) Patent No.: US 11,006,469 B2
(45) Date of Patent: May 11, 2021

(54) METHOD AND APPARATUS FOR SUPPORTING MANAGEMENT ACTIONS FOR VERY HIGH THROUGHPUT IN WIRELESS COMMUNICATIONS

(71) Applicant: InterDigital Patent Holdings, Inc., Wilmington, DE (US)

(72) Inventor: Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/798,902

(22) Filed: Feb. 24, 2020

(65) Prior Publication Data

US 2020/0196362 A1 Jun. 18, 2020

Related U.S. Application Data

(63) Continuation of application No. 16/040,055, filed on Jul. 19, 2018, now Pat. No. 10,616,937, which is a (Continued)

(51) Int. Cl.
*H04W 76/12* (2018.01)
*H04B 7/06* (2006.01)
(Continued)

(52) U.S. Cl.
CPC .......... *H04W 76/12* (2018.02); *H04B 7/0417* (2013.01); *H04B 7/0617* (2013.01);
(Continued)

(58) Field of Classification Search
CPC ... H04W 76/022; H04W 76/12; H04W 24/10; H04W 28/18; H04W 48/16; H04W 72/04;
(Continued)

(56) References Cited

U.S. PATENT DOCUMENTS 7,805,603 B2 9/2010 Qi et al.
7,848,250 B2 12/2010 Sekiya et al.
(Continued)

FOREIGN PATENT DOCUMENTS

WO 07/040564 4/2007
WO 07/105044 9/2007
(Continued)

OTHER PUBLICATIONS

IEEE P802.11aa/D1.0, Draft Standard for Information Technology—Telecommunications and information exchange between systems—Local and metropolitan area networks—Specific requirements—Part 11: Wireless LAN Medium Access Control (MAC) and Physical Layer (PHY) specifications, Amendment 1: MAC Enhancements for Robust Audio Video Streaming, IEEE P802.11aa/D1.0 (Jun. 2010).

(Continued)

*Primary Examiner* — Paul H Masur
(74) *Attorney, Agent, or Firm* — Volpe Koenig

(57) ABSTRACT

A method and apparatus may be used to establish a communication link between devices such as VHT access points (APs) or VHT wireless transmit/receive units (WTRUs). For example, an AP or a WTRU may transmit management action request frames such as Association, Direct Link Setup (DLS) or Tunneled Direct Link Setup (TDLS) request frames. The management action frame may include VHT Capability information of the AP or the WTRU. In response to the management action request frame, the receiving AP or WTRU may transmit management action response frames to establish a communication link. Existing 802.11 management action frames may be used to include the VHT Capability information. The VHT Capability information may be used to implement various VHT features such as channel configurations or Beamforming.

14 Claims, 7 Drawing Sheets

Related U.S. Application Data continuation of application No. 15/454,851, filed on Mar. 9, 2017, now Pat. No. 10,045,385, which is a continuation of application No. 15/186,604, filed on Jun. 20, 2016, now Pat. No. 9,647,743, which is a continuation of application No. 14/718,709, filed on May 21, 2015, now Pat. No. 9,374,146, which is a continuation of application No. 14/260,439, filed on Apr. 24, 2014, now Pat. No. 9,042,362, which is a continuation of application No. 12/945,365, filed on Nov. 12, 2010, now Pat. No. 8,711,821.

(60) Provisional application No. 61/261,197, filed on Nov. 13, 2009.

(51) Int. Cl.

| | | |
|---|---|---|
| *H04W 28/18* | (2009.01) | |
| *H04W 84/12* | (2009.01) | |
| *H04B 7/0417* | (2017.01) | |
| *H04B 7/08* | (2006.01) | |
| *H04L 27/26* | (2006.01) | |
| *H04W 24/10* | (2009.01) | |
| *H04W 48/16* | (2009.01) | |
| *H04L 12/28* | (2006.01) | |
| *H04W 72/04* | (2009.01) | |
| *H04W 88/08* | (2009.01) | |

(52) U.S. Cl.
CPC ......... *H04B 7/0623* (2013.01); *H04B 7/0626* (2013.01); *H04B 7/0634* (2013.01); *H04B 7/0658* (2013.01); *H04B 7/0897* (2013.01); *H04L 27/2627* (2013.01); *H04W 24/10* (2013.01); *H04W 28/18* (2013.01); *H04W 84/12* (2013.01); *H04L 12/28* (2013.01); *H04W 48/16* (2013.01); *H04W 72/04* (2013.01); *H04W 88/08* (2013.01)

(58) Field of Classification Search
CPC .... H04W 84/12; H04W 88/08; H04B 7/0417; H04B 7/0617; H04B 7/0623; H04B 7/0626; H04B 7/0634; H04B 7/0658; H04B 7/0897; H04L 27/2627; H04L 12/28

See application file for complete search history.

(56) References Cited

U.S. PATENT DOCUMENTS

| | | |
|---|---|---|
| 8,284,686 B2 | 10/2012 | Gu et al. |
| 8,374,096 B2 | 2/2013 | Gu et al. |
| 8,451,808 B2 | 5/2013 | Solomon et al. |
| 9,148,256 B2 | 9/2015 | Sampath et al. |
| 2005/0207377 A1 | 9/2005 | Kwon et al. |
| 2007/0213012 A1 | 9/2007 | Marin et al. |
| 2007/0230373 A1 | 10/2007 | Li et al. |
| 2007/0266157 A1 | 11/2007 | Xhafa et al. |
| 2008/0137627 A1 | 6/2008 | Fischer et al. |
| 2008/0192644 A1 | 8/2008 | Utsunomiya et al. |
| 2009/0073945 A1 | 3/2009 | Seok |
| 2009/0124235 A1 | 5/2009 | Bosch et al. |
| 2009/0323608 A1 | 12/2009 | Adachi et al. |
| 2010/0248635 A1 | 9/2010 | Zhang et al. |
| 2010/0260138 A1 | 10/2010 | Liu et al. |
| 2010/0260159 A1 | 10/2010 | Zhang et al. |
| 2011/0051636 A1 | 3/2011 | Van Nee et al. |
| 2011/0051711 A1 | 3/2011 | Kishiyama et al. |
| 2011/0096747 A1 | 4/2011 | Seok |
| 2011/0128900 A1 | 6/2011 | Seok |
| 2011/0199968 A1 | 8/2011 | Kim et al. |
| 2012/0063406 A1 | 3/2012 | Seok |
| 2012/0076091 A1 | 3/2012 | Seok |
| 2012/0087300 A1 | 4/2012 | Seok |
| 2012/0106531 A1 | 5/2012 | Seok et al. |

FOREIGN PATENT DOCUMENTS

| | | |
|---|---|---|
| WO | 07/143472 | 12/2007 |
| WO | 10/013897 | 2/2010 |
| WO | 10/118383 | 10/2010 |
| WO | 10/120119 | 10/2010 |

OTHER PUBLICATIONS

IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60GHz Band, IEEE P802.11ad/D1.0 (Sep. 2010).
IEEE P802.11n/D11.0, Draft Amendment To Standard for Information Technology—Telecommunications And Information Exchange Between Systems—Local And Metropolitan Area Networks—Specific Requirements—Part 11: Wireless LAN Medium Access Control (MAC) And Physical Layer (PHY) Specifications; Amendment5: Enhancements For Higher Throughput, IEEE P802.11n/D11.0, (Jun. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 11, 2005).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 7: Extensions to Direct-Link Setup (DLS), IEEE 802.11z-2010 (Oct. 14, 2010).
IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE Std. 802.11n-2009 (Sep. 11, 2009).
IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band, IEEE Std 802.11g-2003 (Jun. 27, 2003).
Imashioya et al., "RTL Design of 1.2Gbps MIMO WLAN System and its Business Aspect," 9th International Symposium on Communications and Information Technology, pp. 296-301 (Sep. 30, 2009).
Kim et al., 11ac Explicit Feedback Format,: IEEE 802.11-10/1227r0, Nov. 11, 2010.
Liu et al., "VHT Capabilities and Operation elements and VHTC field," IEEE 802.11-10/1267r1 (Nov. 8, 2010).
Stacey et al., "Specification Framework for TGac," IEEE 802.11-09/0992r14, Sep. 15, 2010.
Stacey et al., "Specification Framework for TGac," IEEE 802.11-09/0992r18, Sep. 16, 2010.
Stacey et al., "Specification Framework for TGac," IEEE 802.11-09/0992r2, Sep. 24, 2009.
Stephens et al., "IEEE P802.11 Wireless LANs, Joint Proposal: High Throughput Extension To The 802.11 Standard: MAC", IEEE 802.11-05/1095r5, (Jan. 13, 2006).

(56) References Cited

OTHER PUBLICATIONS

Sun et al., "Adaptive Frequency-Domain Channel Estimator in 4x4 MIMO-OFDM Modems," IEEE Transactions on Very Large Scale Integration (VLSI) Systems, vol. 17, No. 11, pp. 1616-1625 (Nov. 2009).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) Specifications: Higher-Speed Physical Layer Extension in the 2.4 GHz Band, IEEE Std 802.11b-1999 (R2003) (Supplement to ANSI/IEEE Std 802.11, 1999 Edition)(Jun. 12, 2003).

Supplement to IEEE Standard for Information technology—Telecommunications and information exchange between systems—Local and metropolitan area networks—Specific requirements, Part 11: Wireless LAN Medium Access Control (MAC) and Physical Layer (PHY), Specifications High-speed Physical Layer in the 5 GHz Band, IEEE Std 802.11a-1999(R2003) (Jun. 12, 2003).

Trainin et al., "Explicit Feedback Submission," IEEE 802.11-06/0886r4, Sep. 14, 2004.

Zhang et al, "11ac Explicit Sounding and Feedback," IEEE 802.11-10/1105r1, Sep. 14, 2010.

Zhao et al., "Notification on Change of BW and Rx Nss," IEEE 802.11-10/xxxxr0, Nov. 8, 2010.

| 910 | 920 | 930 | 940 | 950 | 960 | 970 | 980 |
|---|---|---|---|---|---|---|---|
| ELEMENT ID | LENGTH | INFORMATION REQUEST INDICATION | FORTY MHz INTOLERANT INDICATION | EIGHTY MHz INTOLERANT INDICATION | 20MHz BSS WIDTH REQUEST | OBSS SCANNING EXEMPTION REQUEST | OBSS SCANNING EXEMPTION GRANT |

| 1010 | 1020 | 1030 | 1040 |
|---|---|---|---|
| ELEMENT ID | LENGTH | REGULATORY CLASS INFORMATION | CHANNEL LIST |

METHOD AND APPARATUS FOR SUPPORTING MANAGEMENT ACTIONS FOR VERY HIGH THROUGHPUT IN WIRELESS COMMUNICATIONS

CROSS REFERENCE TO RELATED APPLICATIONS

This application is a continuation of U.S. patent application Ser. No. 16/040,055 filed Jul. 19, 2018, which is a continuation of U.S. patent application Ser. No. 15/454,851 filed on Mar. 9, 2017 and issued as U.S. Pat. No. 10,045,385 on Aug. 7, 2018, which is a continuation of U.S. patent application Ser. No. 15/186,604 filed on Jun. 20, 2016 and issued as U.S. Pat. No. 9,647,743 on May 9, 2017, which is a continuation of U.S. patent application Ser. No. 14/718,709 filed on May 21, 2015 and issued as U.S. Pat. No. 9,374,146 on Jun. 21, 2016, which is a continuation of U.S. patent application Ser. No. 14/260,439 filed on Apr. 24, 2014 and issued as U.S. Pat. No. 9,042,362 on May 26, 2015, which is a continuation of U.S. patent application Ser. No. 12/945,365 filed on Nov. 12, 2010 and issued as U.S. Pat. No. 8,711,821 on Apr. 29, 2014, which claims the benefit of U.S. Provisional Application Ser. No. 61/261,197 filed on Nov. 13, 2009, the contents of which are hereby incorporated by reference.

BACKGROUND

Supporting higher data rates has long been a goal in wireless communication technologies, including, for example, wireless local area networks (WLANs). A WLAN infrastructure basic service set (BSS) mode may have an Access Point (AP) for the BSS and one or more stations (STAs) associated with the AP. The AP typically may have access to, or interface with, a distribution system (DS) or another type of wired/wireless network that may carry traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations.

Traffic between STAs within the BSS may also be sent to through the AP where the source STA sends traffic to the AP and the AP delivers the traffic to the destination STA. Such traffic between STAs within a BSS may be referred to as peer-to-peer traffic. Such peer-to-peer traffic may also be sent directly between the source and destination STAs with a direct link setup (DLS) using an 802.11e direct link setup (DLS) or an 802.11z tunneled DLS. A WLAN in Independent BSS mode may not have an AP and STAs communicating directly with each other.

The earliest version of the 802.11 standard provided a data rate of 1 Mbps. A subsequent amendment, namely 802.11b, provided a physical layer data rate of 11 Mbps. With the introduction of orthogonal frequency division multiplexing (OFDM) in the 802.11g and 802.11a amendments for 2.4 GHz and 5 GHz bands respectively, the data rates supported were increased to 54 Mbps at the PHY layer. The 802.11n amendment increased the data rates supported to 100 Mbps on top of the MAC layer. It would be desirable to have a method and apparatus configured to support data rates greater than 100 Mbps.

SUMMARY

A method and apparatus may be used to establish a communication link between Very High Throughput (VHT) devices in wireless communications. An STA or an AP may receive a management action request frame. The management action request frame may be an Association, a Direct Link Setup (DLS) or a Tunneled Direct Link Setup (TDLS) request frame. The management action request frame may include a VHT Capability information field for supporting one or more VHT management functions. The one or more VHT management functions may be related to a multi-channel non-contiguous spectrum operation.

In response to receiving the management action request frame, the STA or the AP may transmit a management action response frame. The management action response frame may be an Association, a Direct Link Setup (DLS) or a Tunneled Direct Link Setup (TDLS) response frame. The management action response frame may also include a VHT Capability information associated with the STA or the AP. Based on the VHT Capability information, a DLS or a TDLS communication link may be established with another STA or AP.

BRIEF DESCRIPTION OF THE DRAWINGS

A more detailed understanding may be had from the following description, given by way of example in conjunction with the accompanying drawings wherein:

FIG. 9 is a diagram of an example 20/40/80 BSS Coexistence IE;

FIG. 10 is a diagram of an example 20/40/80 BSS Intolerant Channel Report IE.

DETAILED DESCRIPTION

Figure 1A:
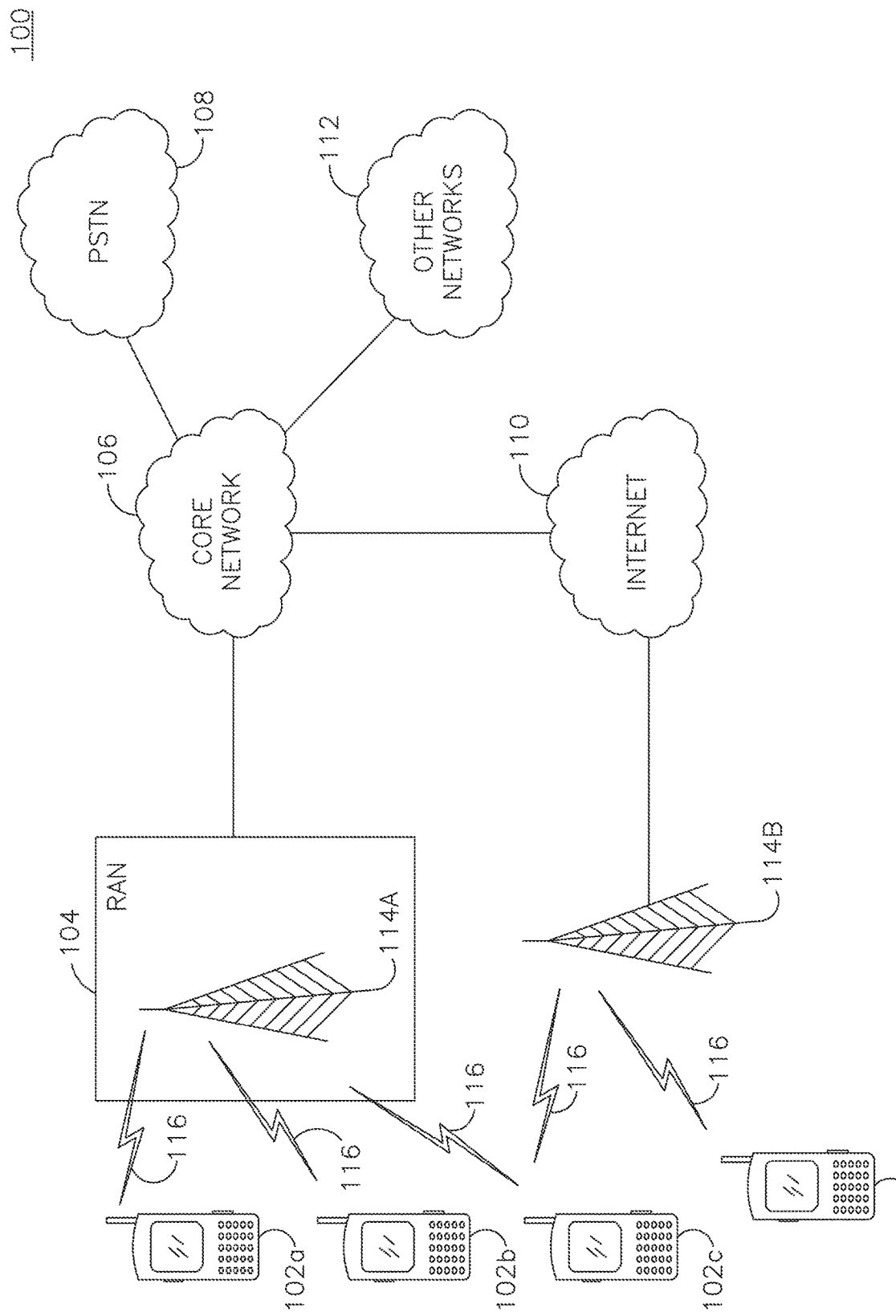
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute of Electrical and Electronics Engineers (IEEE) 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
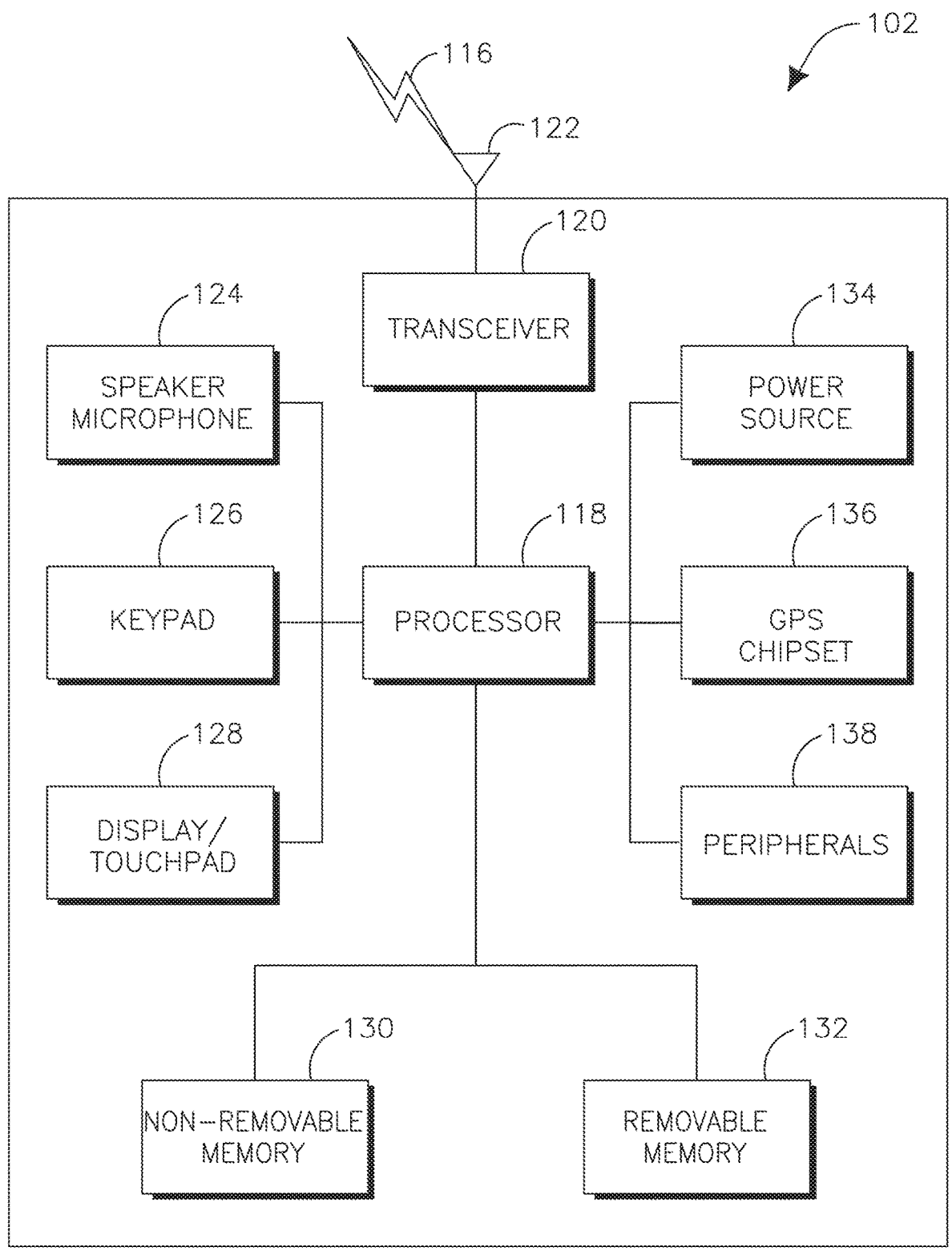
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
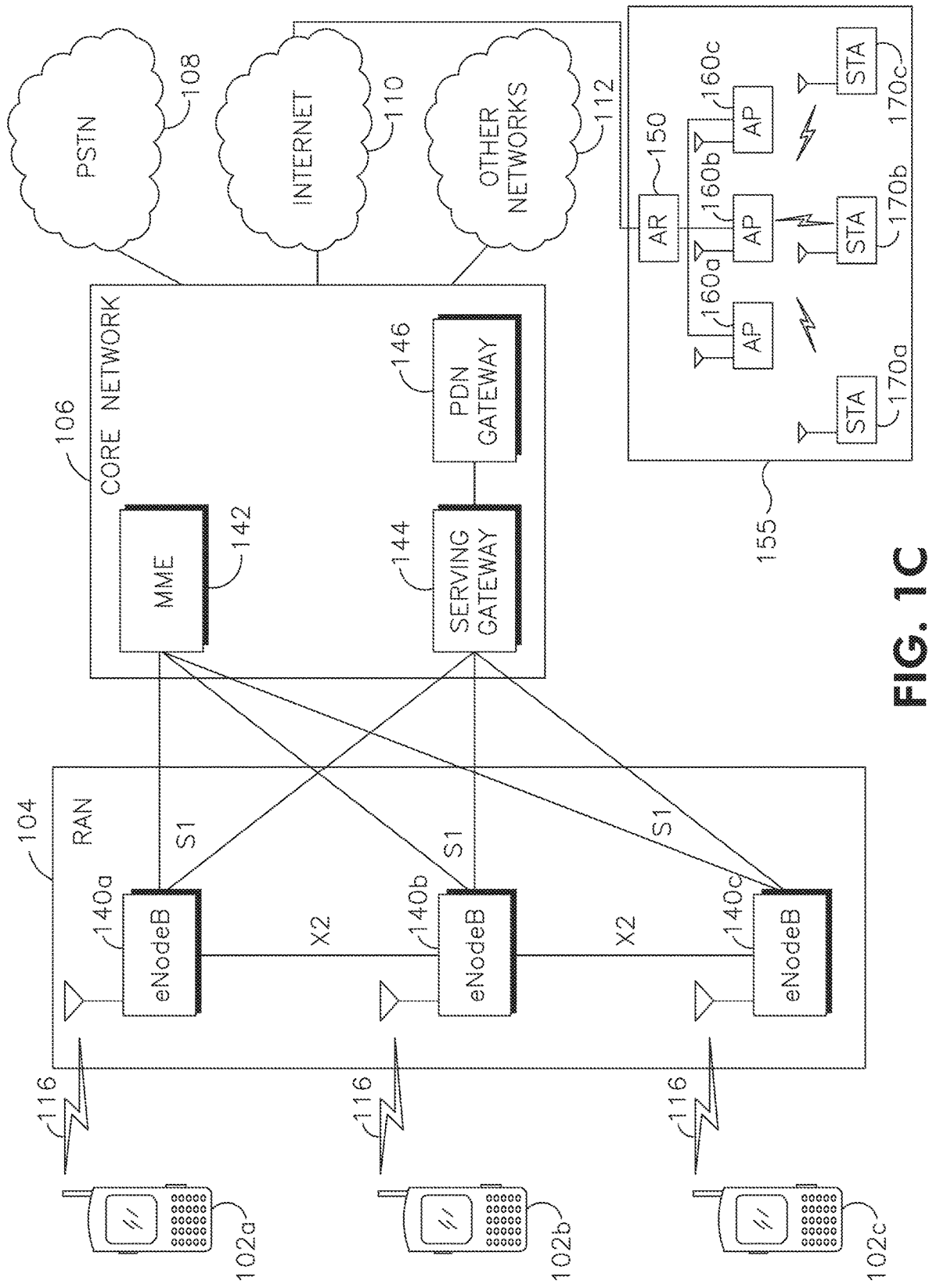
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to herein, the terminology "station" (STA) includes but is not limited to a wireless transmit/receive unit (WTRU), a user equipment (UE), a mobile station, a fixed or mobile subscriber unit, a pager, a cellular telephone, a personal digital assistant (PDA), a computer, a mobile internet device (MID), or any other type of device capable of operating in a wireless environment. When referred to hereafter, the terminology "base station" includes but is not limited to a Node-B, a site controller, an access point (AP), or any other type of interfacing device capable of operating in a wireless environment.

For purposes of explanation, the various embodiments are described in a WLAN context, but the various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), Long Term Evolution (LTE), or any future technology.

WLANs with Very High Throughput (VHT) of greater than 100 Mbps on top of MAC layer may be designed to implement the embodiments described herein. A VHT WLAN that implements these embodiments may also include features such as multi-user multiple input multiple output (MU-MIMO) techniques, new coding features, new power save features, etc. MU-MIMO technology may enable simultaneous transmission to multiple STAs on the same frequency and also enable simultaneous reception from multiple STAs on the same frequency. New VHT protection features for VHT packet transmission and legacy packet transmission may be implemented. In a scenario with densely deployed VHT APs, overlapping BSS management may be necessary because of high interference from neighboring BSSs. In a Television White Space (TVWS) scenario, independently operated networks/devices (and even dissimilar networks/devices in radio technology) may coexist and operate in a common TVWS frequency spectrum.

The IEEE 802.11 High Throughput (HT) Action frames used to support the management actions for HT features may not be adequate in WLANs with VHT features. New management Action frames, referred to herein as "VHT Action frames," may be needed for extending management actions for VHT features. In addition, extensions to IEEE 802.11 Action frames may be needed to support VHT features. Example methods and apparatuses used to support VHT Management Actions in the form of VHT Action frames and VHT extensions to IEEE 802.11 Action frames in WLANs are described herein. The VHT Action frames are in new categories or existing 802.11 categories such as DLS, Public, Spectrum Management, HT, etc. The VHT Action frames if not assigned to existing 802.11 categories will be grouped under a new category called "VHT" category.

VHT STAs in an Infrastructure BSS, Independent BSS/ Ad hoc, or Direct Link Setup scenario may send or receive VHT management action frames. In an Infrastructure BSS scenario, VHT APs may send or receive VHT management action frames as well.

In 802.11 management frames of the subtypes "Action" and "Action No Acknowledgement (ACK)" are used for extended management actions related to various categories such as Spectrum Management, QoS, DLS, Public, HT etc. For example, an 802.11 Public Action frame may be a management Action frame with the Category field set to Public, that may, for example, allow an inter-BSS and AP to communicate with an unassociated-STA. In this example, the transmitting STA/AP and receiving STA/AP may be associated with different BSSs, or one or both of the transmitting and receiving STAs may not be associated to a BSS.

The management frame of subtype "Action No ACK" may not receive an ACK frame from the recipient STA/AP on successful reception. Furthermore, these Action frames of the management frame subtype "Action No ACK" may be aggregated by an STA/AP with one or more of data frames, control frames, and management frames for transmission in an aggregated packet data unit (PDU). An aggregated PDU may contain the individual frames/packets with each individual packet preceded by a packet/frame delimiter that includes information pertaining to the packet and each individual packet followed by padding bits if necessary to round up to a required length; for example a multiple of 4 Octets as in 802.11n. Both management frames of the subtypes "Action" and "Action No ACK" may be referred to herein as either "Action frames" or "management Action frames."

Figure 2:
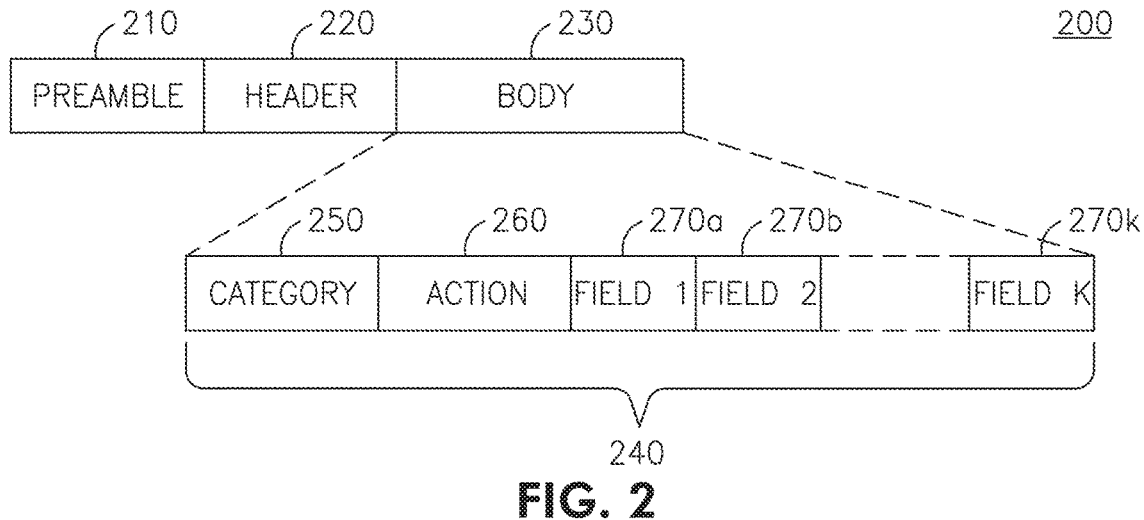
FIG. 2 is a diagram of an example medium access control (MAC) frame.

FIG. 2 is a diagram of an example medium access control (MAC) frame 200. The MAC frame 200 may include a preamble 210, a header 220, and a frame body 230. The frame body 230 may include a VHT management Action frame body 240. The VHT management Action frame body 240 may include an Action Category field 250, followed by an Action field 260. The Action field 260 may identify the type of Action frame, for example, a Setup Request, a Setup Response, or a Teardown. The Action field 260 may be followed by other fields 270a, 270b, . . . 270k. The other fields 270a, 270b, . . . 270k may be specified based on the Action Frame type where one or more of these fields may be Information Elements (IEs).

The AP and STAs may indicate VHT management actions, in any new or existing management/control/data frames, for example, in management frames such as Association, Reassociation, Probe or Beacon frames. An IE may be included in the MAC frames to transfer information.

Figure 3:
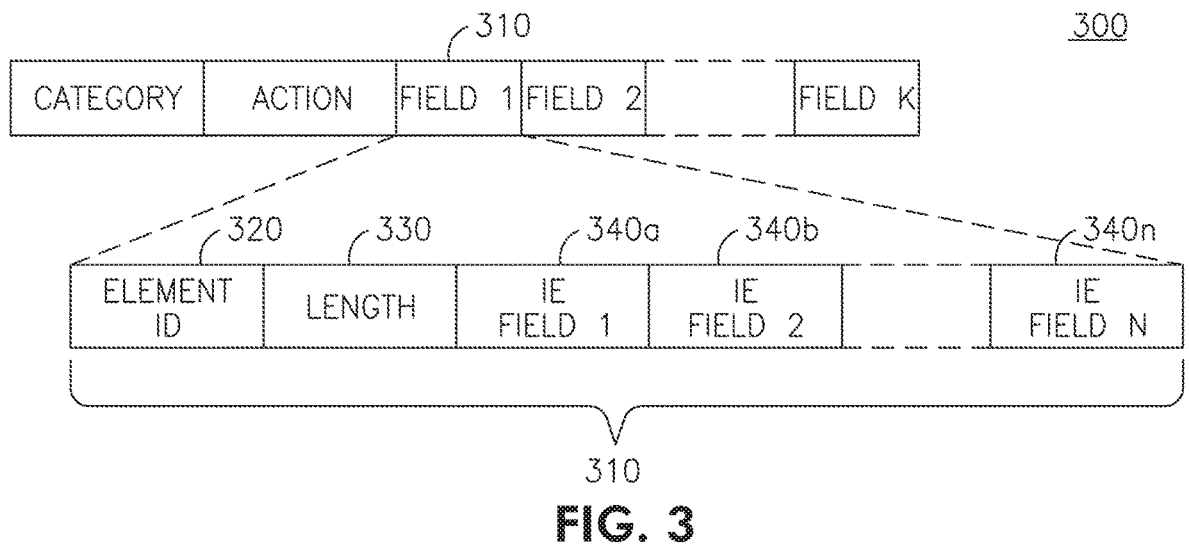
FIG. 3 is a diagram of an example Very High Throughput (VHT) management action frame.

FIG. 3 is a diagram of an example VHT management action frame 300 that includes an IE 310. The IE 310 may include an element ID field 320, a length field 330, and a number of IE fields 340a, 340b, . . . 340n. The element ID field 320 may contain an ID specific to the IE 310. The length field 330 may indicate the length of the IE 310 following the length field 330.

In a first example, an 802.11 Channel Switch Announcement frame may be modified to support the VHT increased channel bandwidth transmission mode of 80 MHz. The Channel Switch Announcement frame may be sent by an AP in a BSS or a STA in an Independent BSS to advertise when it is switching to a new channel, the channel number and bandwidth configuration. The 802.11 Channel Switch Announcement frame may be an Action frame of Category Spectrum Management which contains a Secondary Channel Offset IE.

Figure 4:
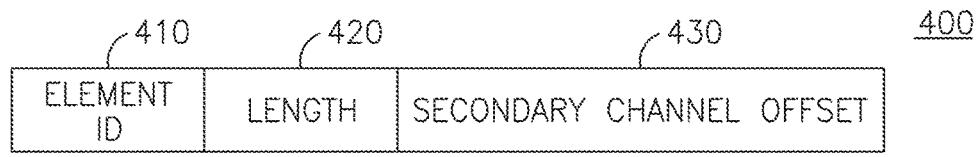
FIG. 4 is a diagram of an example Secondary Channel Offset Information Element (IE)

FIG. 4 is a diagram of an example Secondary Channel Offset IE 400 that may be modified to indicate secondary channel offset information values to support the VHT 80 MHz bandwidth transmission and VHT Multi-channel transmission. The Secondary Channel Offset IE 400 may comprise an element ID field 410, a length field 420, and a Secondary Channel Offset field 430.

The Secondary Channel Offset field 430 may indicate the position of the 20 MHz secondary channel relative to the 20 MHz primary channel for 40 MHz transmission bandwidth in the existing 802.11n standard. In a VHT 80 MHz bandwidth transmission scenario, there may be three 20 MHz secondary channels along with a primary 20 MHz channel providing the 80 MHz transmission bandwidth. Accordingly, for the 80 MHz bandwidth transmission, the positions of the three 20 MHz secondary channels with respect to the 20 MHz primary channel may be indicated with values in the Secondary Channel Offset field 430. The 20 MHz channels making up the 80 MHz bandwidth need not be contiguous. The VHT features may support the transmission and reception of such an 80 MHz bandwidth signal. The VHT features may also support multi-channel transmissions, including multiple parallel transmissions, using various combinations of 20 MHz channels.

In the multi-channel transmission scenario, the configuration of the channels may be indicated relative to the primary channel in the Secondary Channel Offset field 430. In addition, the VHT features may support a 40 MHz bandwidth signal transmission and reception where the secondary channel may not be adjacent to the primary channel, and may be indicated in the Secondary Channel Offset field 430. An example of the possible secondary channel configurations and corresponding values for the Secondary Channel Offset field 430 corresponding to the VHT 80 MHz bandwidth transmission, VHT 40 MHz bandwidth transmission, and VHT Multi-channel transmission is shown in Table 1. An exact numerical value may be chosen flexibly from any unused value within the range from 0 to 255.

TABLE 1

Secondary channel configurations.

| Value | Description |
| --- | --- |
| 0 | Indicates that no secondary channel is present (just 20 MHz) |
| 1 | Indicates that the secondary channel is above the primary channel (for 40 MHz) |
| 2 | Unused |
| 3 | Indicates that the secondary channel is below the primary channel (for 40 MHz) |
| Any unused value up to 256 (flexible) | Indicates 3 secondary channels immediately above the primary channel (80 MHz bandwidth formed by 4 contiguous 20 MHz channels) |
| Any unused value up to 256 (flexible) | Indicates 3 secondary channels immediately below the primary channel (80 MHz bandwidth formed by 4 contiguous 20 MHz channels) |
| Any unused value up to 256 (flexible) | Indicates 2 secondary channels immediately above the primary channel and 1 secondary channel immediately below the primary channel (80 MHz bandwidth formed by 4 contiguous 20 MHz channels) |
| Any unused value up to 256 (flexible) | Indicates 1 secondary channel immediately above the primary channel and 2 secondary channels immediately below the primary channel (80 MHz bandwidth formed by 4 contiguous 20 MHz channels) |
| Any unused value up to 256 (flexible) | Indicates configuration of positions of each of the 3 secondary channels relative to the primary channel where the 80 MHz bandwidth is not formed by 4 contiguous 20 MHz channels. Many such configurations are possible and each may have a value associated with it. |

TABLE 1-continued

Secondary channel configurations.

| Value | Description |
|---|---|
| Any unused value up to 256 (flexible) | Indicates configuration of the position of the secondary channel relative to the primary channel where a 40 MHz bandwidth is not formed by 2 contiguous 20 MHz channels. Many such configurations are possible and each may have a value associated with it. |
| Any unused value up to 256 (flexible) | Indicates configuration of secondary channels for VHT Multi-channel transmission relative to the primary channel. Many such configurations are possible and each may have a value associated with it. |
| Remaining up to 255 | Unused/Reserved |

The Secondary Channel Offset field 430 may be modified to include one or more values to indicate secondary channel configurations supporting VHT 80 MHz bandwidth transmission, VHT 40 MHz bandwidth transmission and VHT Multi-channel transmission. The Secondary Channel Offset field 430 may be included in, for example: 1) the beacon, probe response, association response, and reassociation response frames sent by an AP or an STA in an Independent BSS; 2) a VHT Operation IE included in frames sent by an AP or an STA in an Independent BSS; 3) a Channel Switch Announcement (Action) frame sent by an AP or an STA in an Independent BSS; or 4) a VHT Capabilities IE included in frames sent by an AP or an STA.

In a second example, a VHT Notify bandwidth configuration frame may be an Action frame of category VHT, and may be used to support the various bandwidths 20/40/80 MHz in VHT WLANs. In this example, a VHT STA or AP may send the VHT Notify bandwidth configuration frame to change the bandwidth configuration of frames that are sent to it.

Figure 5:
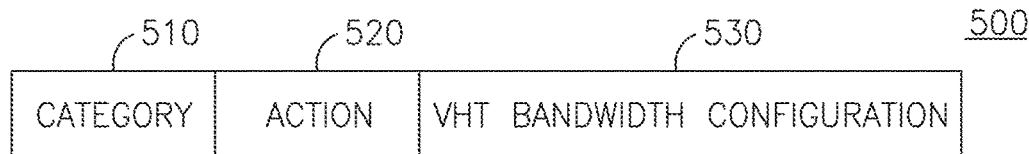
FIG. 5 is a diagram of an example VHT Notify bandwidth configuration frame.

FIG. 5 is a diagram of an example VHT Notify bandwidth configuration frame 500. The VHT Notify bandwidth configuration frame 500 may include a Category field 510, an Action field 520, and a VHT bandwidth configuration field 530. The Category field 510 may be set to a value to indicate VHT. The Action field 520 may be set to a value that represents a VHT Notify bandwidth configuration. The VHT bandwidth configuration field 530 may contain a bandwidth configuration requested for frames to be sent to the STA or AP transmitting this action frame. The values for the VHT bandwidth configuration field 530 may correspond to the various bandwidth configurations that are possible with VHT 80 MHz bandwidth transmission, VHT 40 MHz bandwidth transmission, and VHT multi-channel transmission. The various bandwidth configurations may be provided, for example, in a modified Secondary Channel Offset IE and/or a Secondary Channel Offset field 430 described in the first example and shown in FIG. 4 and Table 1, respectively. Alternatively, an 802.11 Notify Channel Width frame of Category HT may be modified to support VHT by adding one or more of the VHT bandwidth configurations shown in Table 1 to the 802.11 Channel Width field.

In a third example, a VHT Set Phased Coexistence Operation (PCO) Phase frame may be an Action frame of category VHT, and used to support PCO in VHT WLANs. A VHT WLAN BSS may adopt a VHT PCO where the VHT AP may divide time between 20/40/80 MHz bandwidth operation. Note that all possible combinations may be considered, for example, 20/40/80 MHz, 40/80 MHz, 20/80 MHz, and 20/40 MHz. In addition, since there may be contiguous and non-contiguous channel compositions that constitute the 40 MHz and 80 MHz bandwidths, there may be several possible bandwidth configurations or PCO phases for 40 MHz and 80 MHz. For example, an AP may switch the BSS operation amongst a predetermined set of bandwidths for a VHT phased coexistence operation. Another feature may be added to the VHT PCO where multi-channel transmission configurations, including parallel channel transmission configurations, are supported as additional PCO phases. In this example, the VHT AP may indicate switching to these multi-channel transmission configurations/phases. A VHT Set PCO Phase frame may be sent by an AP to announce the phase change amongst the 20 MHz, 40 MHz and 80 MHz phases.

Figure 6:
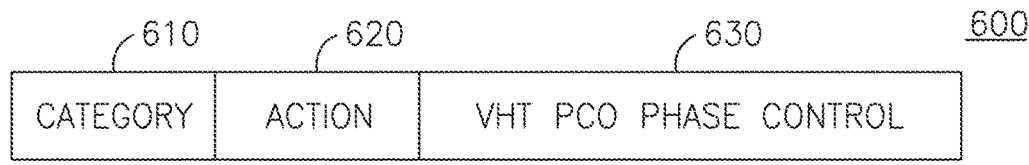
FIG. 6 is a diagram of an example VHT Set Phased Coexistence Operation (PCO) Phase frame.

FIG. 6 is a diagram of an example VHT Set PCO Phase frame 600. The VHT Set PCO Phase frame 600 may include a Category field 610, an Action field 620, and a VHT PCO Phase Control field 630. The Category field 610 may be set to a value to indicate VHT. The Action field 620 may be set to a value defined for representing VHT Set PCO Phase. The VHT PCO Phase Control field 630 may indicate a current PCO phase. This information may be indicated in a modified 802.11 PCO Phase Control field, and it may include one or more of the values as shown in Table 2.

TABLE 2

A modified 802.11 PCO Phase Control field with values for VHT PCO phases.

| Value | Description |
|---|---|
| 0 | Indicates 20 MHz Phase |
| 1 | Indicates 40 MHz Phase |
| Any unused value up to 256 (flexible) | Indicates 40 MHz bandwidth configuration relative to the primary channel formed by: (a) 2 contiguous or (b) 2 non-contiguous 20 MHz channels- many such configurations are possible and each may have a value associated with it. |
| Any unused value up to 256 (flexible) | Indicates 80 MHz bandwidth configuration relative to the primary channel formed by 4 contiguous 20 MHz channels - many such configurations are possible and each may have a value associated with it. |
| Any unused value | Indicates 80 MHz bandwidth configuration relative to the primary |

TABLE 2-continued

A modified 802.11 PCO Phase Control field with values for VHT PCO phases.

| Value | Description |
|---|---|
| up to 256 (flexible) | channel not formed by 4 contiguous 20 MHz channels- many such configurations are possible and each may have a value associated with it. |
| Any unused value up to 256 (flexible) | Indicates VHT Multi-channel transmission configuration relative to the primary channel - many such configurations are possible and each may have a value associated with it. |
| Remaining up to 255 | Not used/Reserved |

The VHT PCO phases may correspond to one or more of the various bandwidth configurations that may be supported in a VHT 80 MHz bandwidth transmission, a VHT 40 MHz bandwidth transmission, and a VHT multi-channel transmission, as shown in Table 2. In one alternative, an 802.11 Set PCO Phase frame of Category HT may be modified to support VHT PCO by replacing an 802.11 PCO Phase Control field with a modified PCO Phase Control field that includes values for VHT PCO Phases as indicated in Table 2. In another alternative, a current VHT PCO Phase of operation indication, or information related thereto, may be included in the beacon, probe response, association response, and reassociation response frames sent by the AP or an STA in an Independent BSS, or in a VHT Operation IE included in frames sent by an AP or an STA in an Independent BSS.

In a fourth example, an 802.11 MIMO Control field may be modified, or a VHT MIMO Control field may be created, to include one or more of the following: 1) a number of columns for a channel state information and/or a transmit beamforming feedback matrix ranging from 1 to 32; 2) a number of rows for a channel state information/transmit beamforming feedback matrix ranging from 1 to 32; 3) a MIMO Control Channel Width indication for VHT covering various bandwidth configuration cases for 20/40/80 MHz as shown in Table 1; 4) a number of OFDM sub-carriers grouped into one or more sets of sub-carriers ranging from 1 to 16; 5) a number of bits in the representation of the real and imaginary parts of each element in the channel state information/transmit beamforming feedback matrix ranging from 4 to 16; 6) a size of the code book information for a Compressed beamforming matrix; 7) a remaining segment number ranging from 0 to 31 for segments of an associated measurement report; and 8) a sounding timestamp corresponding to an end of the reception of a sounding packet, where the sounding packet may be used to generate feedback information to include in the frame that includes the MIMO Control field. The modified MIMO Control field and the VHT MIMO Control field may be included in an 802.11 HT Channel State Information (CSI) Action frame, a VHT CSI Action frame, an 802.11 HT Non-compressed Beamforming Action frame, a VHT Non-compressed Beamforming Action frame, an 802.11 HT Compressed Beamforming Action frame, or a VHT Compressed Beamforming Action frame.

Figure 7:
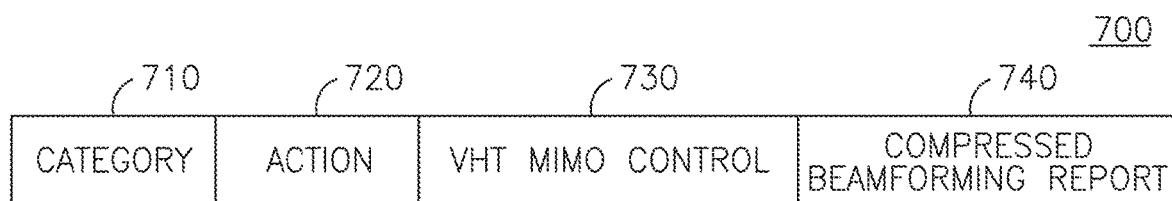
FIG. 7 is a diagram of an example VHT Multiple Input Multiple Output (MIMO) Control Action frame.

FIG. 7 is a diagram of an example frame body of a VHT Compressed Beamforming Report Action frame 700. The VHT Compressed Beamforming Report Action frame 700 may include a Category field 710, an Action field 720, a VHT MIMO Control field 730, and a Compressed Beamforming Report 740.

In a fifth example, a modified 802.11 Compressed Beamforming Report field for 20/40/80 MHz, or the Compressed Beamforming Report field 740 configured to support VHT, may include one or more of the following: 1) an Average Signal to Noise Ratio of the STA sending the report for each space-time stream with a resolution that may be in a range from 8 bits to 16 bits, where a number of streams may be specified in a corresponding MIMO Control field as a number of columns in a matrix; 2) a Beamforming Feedback Matrix for OFDM sub-carriers with indices in the range −128 to 128 for 80 MHz; 3) a Beamforming Feedback Matrix for OFDM sub-carriers with indices in the range −58 to 58 for 40 MHz; and 4) a Beamforming Feedback Matrix for OFDM sub-carriers with indices in the range −28 to 28 for 20 MHz. The modified 802.11 Compressed Beamforming Report field for 20/40/80 MHz and the Compressed Beamforming Report field configured to support VHT may be included in an 802.11 HT Compressed Beamforming Action frame or a VHT Compressed Beamforming Action frame. The 802.11 HT Compressed Beamforming Action frame and the VHT Compressed Beamforming Action frame may be sent by an STA/AP in response to a Compressed Beamforming feedback request indication included in an HT Control field or VHT Control field of a frame received from a requesting STA/AP.

In a sixth example, a modified 802.11 Non-compressed Beamforming Report field for 20/40/80 MHz, or a Non-compressed Beamforming Report field configured to support VHT, may include one or more of the following: 1) an Average Signal to Noise Ratio of the STA sending the report for each space-time stream with a resolution that may range from 8 bits to 16 bits, where the number of streams may be specified in a corresponding MIMO Control field as a number of columns in a matrix; 2) a Beamforming Feedback Matrix for OFDM sub-carriers with indices in the range −128 to 128 for 80 MHz; 3) a Beamforming Feedback Matrix for OFDM sub-carriers with indices in the range −58 to 58 for 40 MHz; and 4) a Beamforming Feedback Matrix for OFDM sub-carriers with indices in the range −28 to 28 for 20 MHz. The modified 802.11 Non-compressed Beamforming Report fields for 20/40/80 MHz and the Non-compressed Beamforming Report field configured to support VHT may be included in an 802.11 HT Non-compressed Beamforming Action frame or a VHT Non-compressed Beamforming Action frame. The 802.11 HT Non-compressed Beamforming Action frame and the VHT Non-compressed Beamforming Action frame may be sent by an STA/AP in response to a Non-compressed Beamforming feedback request indication included in an HT Control field or a VHT Control field of a frame received from a requesting STA/AP.

In a seventh example, a modified 802.11 CSI Report field for 20/40/80 MHz, or a CSI Report field configured to support VHT, may include one or more of the following: 1) a Signal to Noise Ratio (SNR) for each receive chain of the STA sending the report with a resolution that may range from 8 bits up to 16 bits, where the number of receive chains may be specified in a corresponding MIMO Control field as a number of rows in a matrix; 2) a CSI Matrix for OFDM sub-carriers with indices in the range −128 to 128 for 80 MHz; 3) a CSI Matrix for OFDM sub-carriers with indices in the range −58 to 58 for 40 MHz; and 4) a CSI Matrix for OFDM sub-carriers with indices in the range −28 to 28 for 20 MHz. The modified 802.11 CSI Report field for 20/40/80 MHz and the CSI Report field configured to support VHT, may be included in an 802.11 HT CSI Action frame or in a VHT CSI Action frame. The 802.11 HT CSI Action frame and the VHT CSI Action frame may be sent by an STA or an AP in response to a CSI feedback request indication included in an HT Control field or VHT Control field of a frame received from a requesting STA or AP.

In an eighth example, 802.11 Action frames may be modified to include a VHT Capability IE. For example, a VHT Capability IE may be added to the frame body of an 802.11 DLS Request frame, an 802.11 DLS Response frame, an 802.11 tunneled direct link setup (TDLS) Setup Request frame, and an 802.11 TDLS Setup Response frame. The VHT Capabilities IE may be added by a VHT STA/AP in the 802.11 DLS Request and Response frames. The VHT Capabilities IE may be added by a VHT STA in the 802.11 TDLS Setup Request and TDLS Setup Response frames.

In a ninth example, a 20/40/80 BSS Coexistence Management frame may be an Action frame with a category of Public, and may be used to support the VHT increased channel bandwidth transmission mode of 80 MHz. The 20/40/80 BSS Coexistence frame may be used by STAs or APs to exchange information for 20/40/80 BSS Coexistence.

Figure 8:
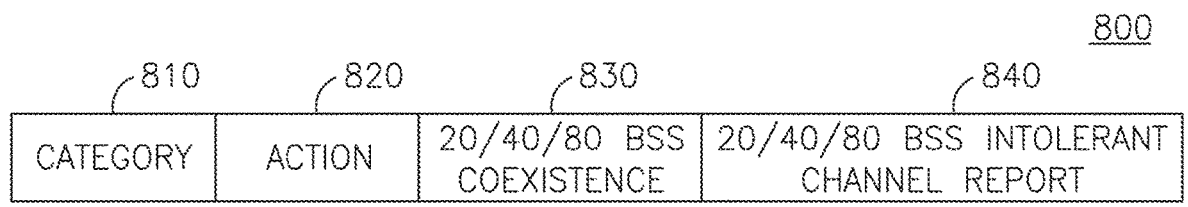
FIG. 8 is a diagram of an example 20/40/80 BSS Coexistence Management frame.

FIG. 8 is a diagram of an example 20/40/80 BSS Coexistence Management frame 800. The 20/40/80 BSS Coexistence Management frame 800 may include a Category field 810, an Action field 820, a 20/40/80 BSS Coexistence field 830, and a 20/40/80 BSS Intolerant Channel Report field 840. The Category field 810 may be set to a value to indicate Public. The Action field 820 may be set to a value defined for 20/40/80 BSS Coexistence Management.

The 20/40/80 BSS Coexistence field 830 may contain information related to 20/40/80 BSS Coexistence. The 20/40/80 BSS Coexistence field 830 may contain a 20/40/80 BSS Coexistence IE 900 as shown in FIG. 9. The 20/40/80 BSS Coexistence IE 900 may be used by a STA or an AP to exchange information for 20/40/80 BSS Coexistence. In addition to the 20/40/80 BSS Coexistence Management frame 800, the STA or the AP may include the 20/40/80 BSS Coexistence IE 900 in a Beacon, Probe Request, Probe Response, Association Request, Association Response, Reassociation Request, and Reassociation Response frames.

The 20/40/80 BSS Coexistence IE 900 may include an Element ID field 910, a length field 920, an Information Request indication field 930, a 40 MHz intolerant indication field 940, an 80 MHz intolerant indication field 950, a 20 MHz BSS width request field 960, an overlapping BSS (OBSS) scanning exemption request field 970, and an OBSS scanning exemption grant field 980. The Element ID field 910 may indicate a value specifically for the 20/40/80 BSS Coexistence IE 900. The Length field 920 may contain the length of the 20/40/80 BSS Coexistence IE 900 following the Length field 920. The Information Request indication field 930 may be used by a transmitting STA or AP to indicate to the recipient to send a 20/40/80 BSS Coexistence Management frame 800 in response.

The 40 MHz Intolerant indication field 940, when set to a predetermined value, may indicate that the AP that receives or reports this information may be prohibited from operating a 20/40 MHz BSS. When this field is not set to that specific value, it may not prohibit a receiving AP from operating as a 20/40 MHz BSS. The 80 MHz Intolerant indication field 950, when set to a predetermined value, may indicate that the AP that receives or reports this information may be prohibited from operating a 20/40/80 MHz BSS. When this field is not set to that specific value, it may not prohibit a receiving AP from operating as a 20/40/80 MHz BSS. The 20 MHz BSS Width Request field 960, when set to a predetermined value, may indicate that the receiving AP may be prohibited from operating as a 20/40/80 MHz BSS or a 20/40 MHz BSS.

The OBSS Scanning Exemption Request field 970, when set a predetermined value, may indicate that the transmitting STA requests to be exempted from OBSS scanning by the receiving AP. The OBSS Scanning Exemption Grant field 980, when set a predetermined value, may indicate that the receiving STA may be exempted by the transmitting AP from performing OBSS Scanning. In an alternative embodiment, the 20/40/80 BSS Coexistence IE 900 may be created by modifying an 802.11 20/40 BSS Coexistence element by adding an 80 MHz Intolerant indication field 950.

The 20/40/80 BSS Intolerant Channel Report 840 may contain information on channels that disallow a 20/40/80 MHz BSS operation. For example, the 20/40/80 BSS Intolerant Channel Report field 840 may contain a 20/40/80 BSS Intolerant Channel Report IE 1000 as shown in FIG. 10.

The 20/40/80 BSS Intolerant Channel Report IE 1000 may include an Element ID field 1010, a Length field 1020, a Regulatory Class Information field 1030, and a Channel List field 1040. The Element ID field 1010 may indicate a value specifically for the 20/40/80 BSS Intolerant Channel Report IE 1000. The Length field 1020 may contain the length of the 20/40/80 BSS Intolerant Channel Report IE 1000 following the Length field 1020. The Regulatory Class Information field 1030 may contain information that specifies the regulatory class in which the Channel List in the Channel List field 1040 may be valid. The Channel List field 1040 may contain a list of channels on which a 20/40/80 MHz BSS operation is disallowed.

In a tenth example, an 802.11 Antenna Selection Indices field may be modified, or a VHT Antenna Selection Indices field may be created, to support up to 16 Antennas. The 802.11 Antenna Selection Indices field may be 8 bits in length and may support only 8 antennas, where each bit in the field may be used to indicate the selection of a corresponding antenna. The modified 802.11 Antenna Selection Indices field and the VHT Antenna Selection Indices field may have 16 bits, where each bit may correspond to an antenna index and may be used to indicate a selection of a corresponding antenna. The modified 802.11 Antenna Selection Indices field and the VHT Antenna Selection Indices field may be included in an 802.11 HT Antenna Selection Indices Feedback Action frame or a VHT Antenna Selection Indices Feedback Action frame, and sent by an STA or an AP in response to an Antenna Selection Indices feedback request indication included in an HT Control field or a VHT Control field of a frame received from a requesting STA or AP.

Figure 11:
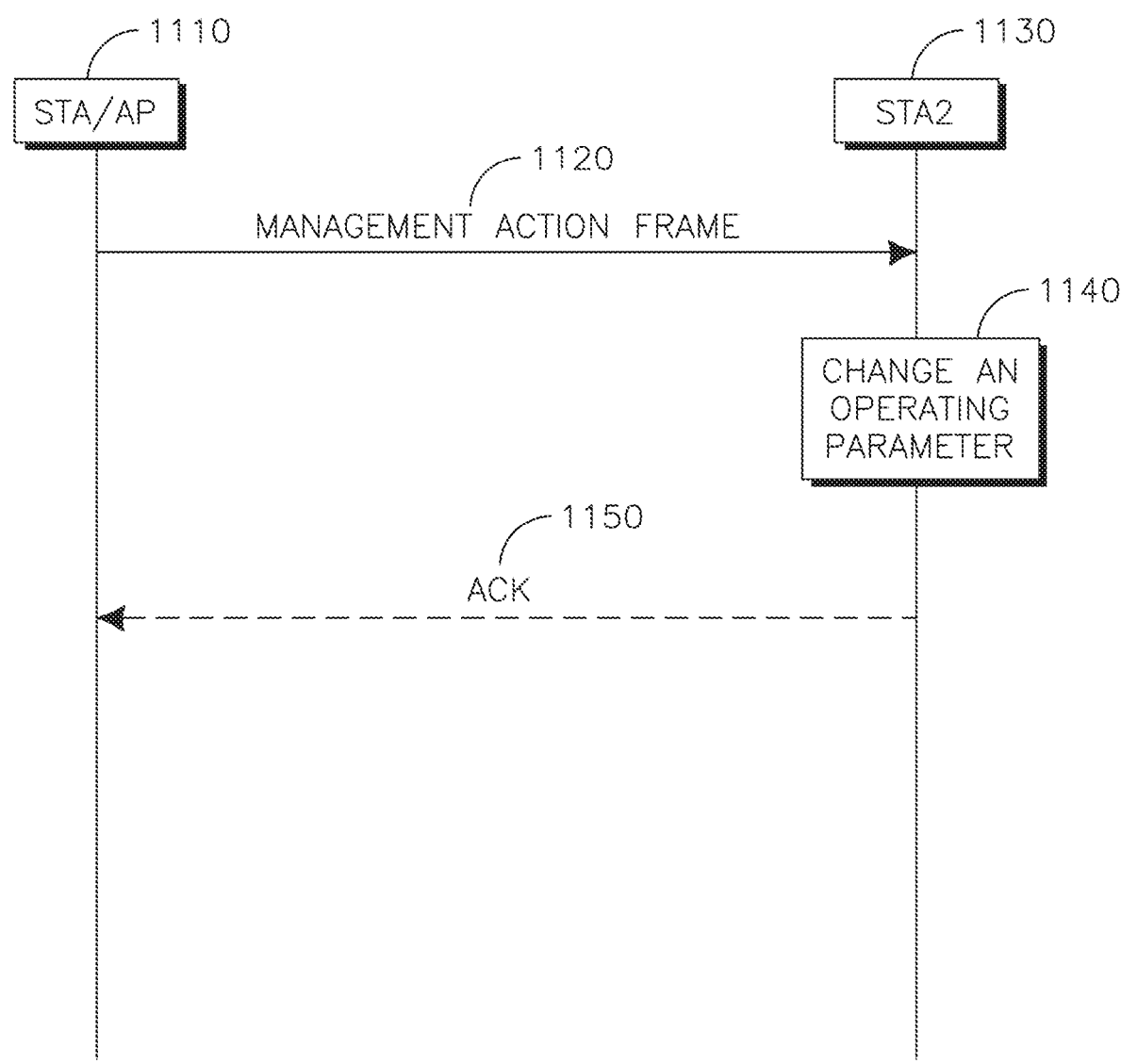
FIG. 11 is a flow diagram of an example method for supporting management actions in VHT communications.

FIG. 11 is a flow diagram of an example method 1100 for supporting management actions in VHT communications. An STA/AP 1110 may transmit a management action frame 1120 to another STA2 1130. The management action frame 1120 may be a VHT Action frame, and may be assigned a category and/or a subtype. STA2 1130 may change an operating parameter 1140 based on a field in the management action frame 1120.

The assignment of category for each of the VHT Action frames may be flexible such that they may be assigned a category that is new such as "VHT" or any 802.11 category. In addition, the VHT Action frames may have subtypes "Action" or "Action with ACK", and "Action No ACK." Moreover the "Action No ACK" subtype VHT Action frames may be aggregated by an STA/AP with one or more of data frames, control frames, and management frames for transmission in an aggregated packet data unit. For example, STA2 1130, or an AP, may transmit an ACK 1150 if it receives a VHT Action frame of a subtype "Action." STA2 1130, or an AP, may not transmit an ACK if it receives a VHT Action frame of a subtype "Action No ACK."

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in wireless communications, the method comprising:
   receiving a sounding packet at a station (STA) configured to support a Very High Throughput (VHT) transmission; and
   transmitting, from the STA, an Action No Acknowledgement (ACK) frame that includes a VHT multiple input multiple output (MIMO) Control field and a VHT Compressed Beamforming Report field, wherein the VHT MIMO Control field indicates a channel width related to a multi-channel non-contiguous spectrum transmission, and wherein the VHT Compressed Beamforming Report field includes an average signal to noise ratio (SNR) for each of a number of space-time streams where the number of space-time streams are indicated in the VHT MIMO Control field as a number of columns in a matrix.

2. The method of claim 1, wherein the VHT MIMO Control field indicates a number of columns in the matrix and a number of rows in the matrix.

3. The method of claim 1, wherein the VHT MIMO Control field indicates a bandwidth configuration that includes a plurality of secondary channels for a VHT multi-channel transmission relative to a primary channel.

4. The method of claim 1, wherein the VHT Compressed Beamforming Report field includes a plurality of orthogonal frequency division multiplex (OFDM) sub-carriers, wherein the OFDM sub-carriers are grouped in a set.

5. The method of claim 1, wherein the VHT MIMO Control field includes a compressed beamforming matrix code book information size.

6. The method of claim 1, wherein the VHT MIMO Control field indicates a remaining segment number of an associated measurement report.

7. The method of claim 1, wherein the VHT Compressed Beamforming Report field includes a Beamforming Feedback Matrix for each of a number of space-time streams.

8. A station (STA) comprising:
   a receiver configured to receive a sounding packet; and
   a transmitter configured to transmit an Action No Acknowledgement (ACK) frame that includes a Very High Throughput (VHT) multiple input multiple output (MIMO) Control field and a VHT Compressed Beamforming Report field, wherein the VHT MIMO Control field indicates a channel width related to a multi-channel non-contiguous spectrum transmission, and wherein the VHT Compressed Beamforming Report field includes an average signal to noise ratio (SNR) for each of a number of space-time streams where the number of space-time streams are indicated in the VHT MIMO Control field as a number of columns in a matrix.

9. The STA of claim 8, wherein the VHT MIMO Control field indicates a number of columns in the matrix and a number of rows in the matrix.

10. The STA of claim 8, wherein the VHT MIMO Control field indicates a bandwidth configuration that includes a plurality of secondary channels for a VHT multi-channel transmission relative to a primary channel.

11. The STA of claim 8, wherein the VHT Compressed Beamforming Report field includes a plurality of orthogonal frequency division multiplex (OFDM) sub-carriers, wherein the OFDM sub-carriers are grouped in a set.

12. The STA of claim 8, wherein the VHT MIMO Control field includes a compressed beamforming matrix code book information size.

13. The STA of claim 8, wherein the VHT MIMO Control field indicates a remaining segment number of an associated measurement report.

14. The STA of claim 9, wherein the VHT Compressed Beamforming Report field includes a Beamforming Feedback Matrix for each of a number of space-time streams.

* * * * *